May 1, 1923.
W. B. ENGLER
DUMP BODY HOIST
Filed Nov. 27, 1920
1,453,663
4 Sheets-Sheet 1
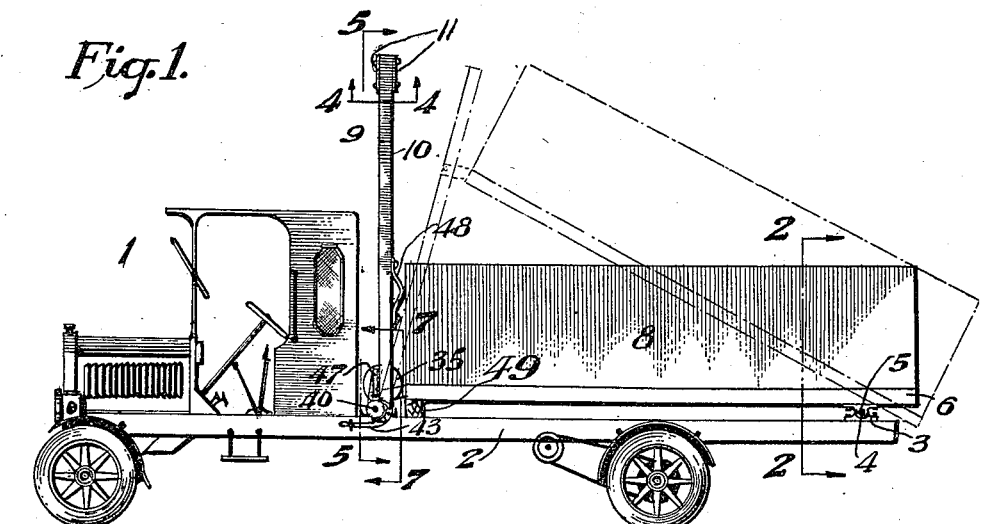
Fig.1.
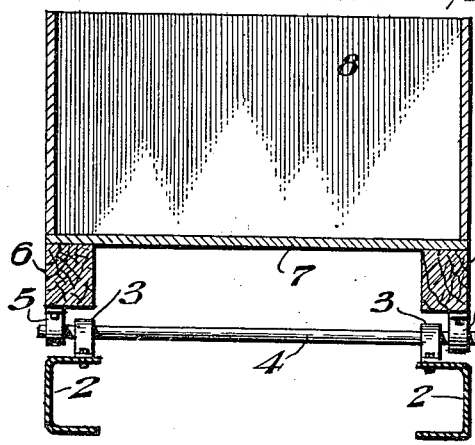
Fig.2. On Line 2-2-Fig.1.
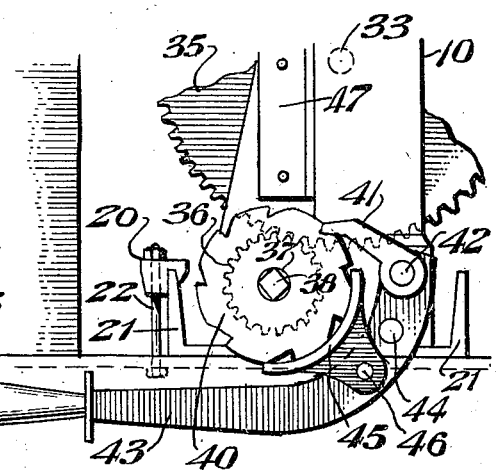
Fig.3.
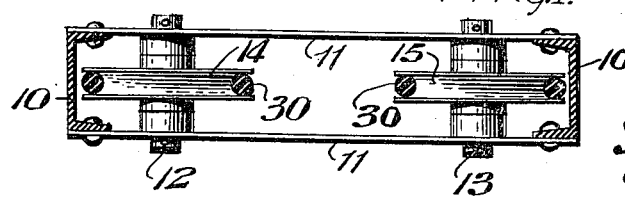
Fig.4. On Line 4-4-Fig.1.
INVENTOR:
William B. Engler
BY Wiedersheim & Fairbanks
ATTORNEYS.

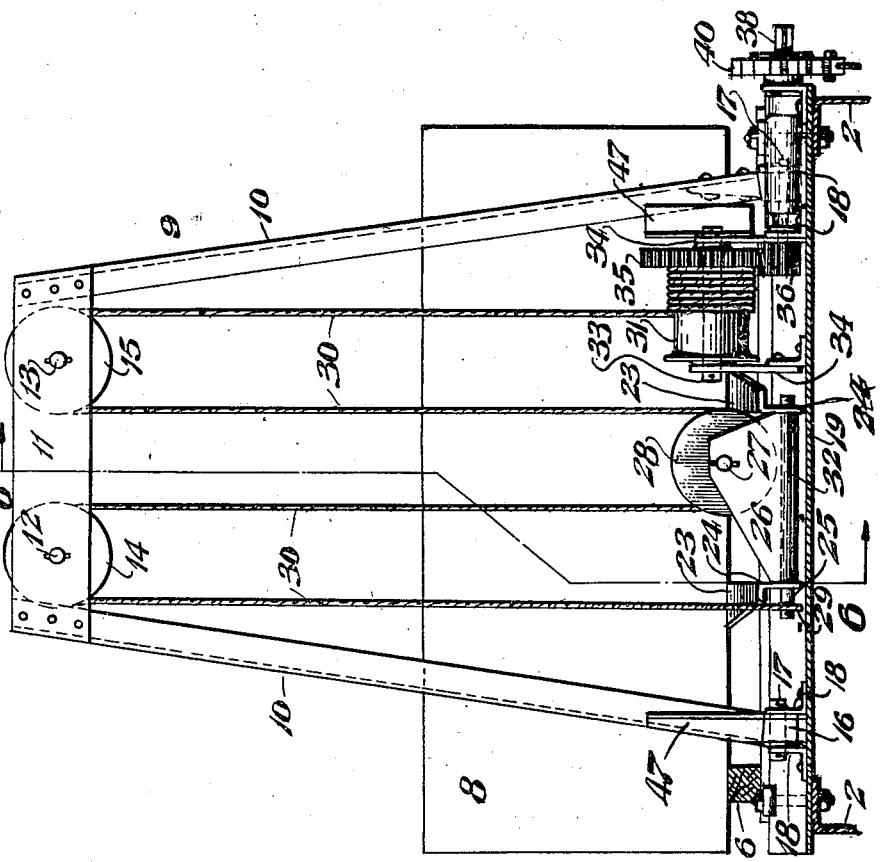

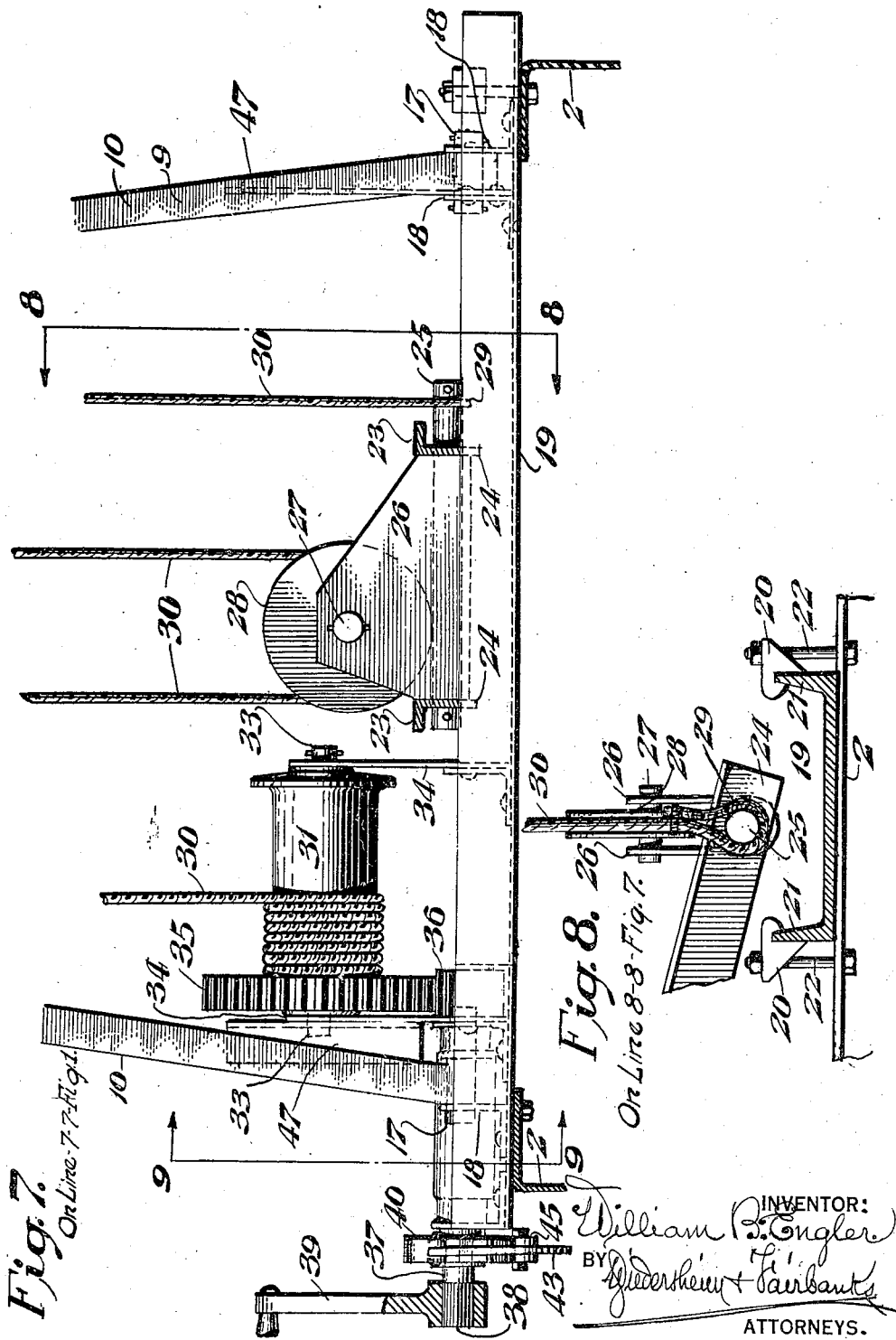

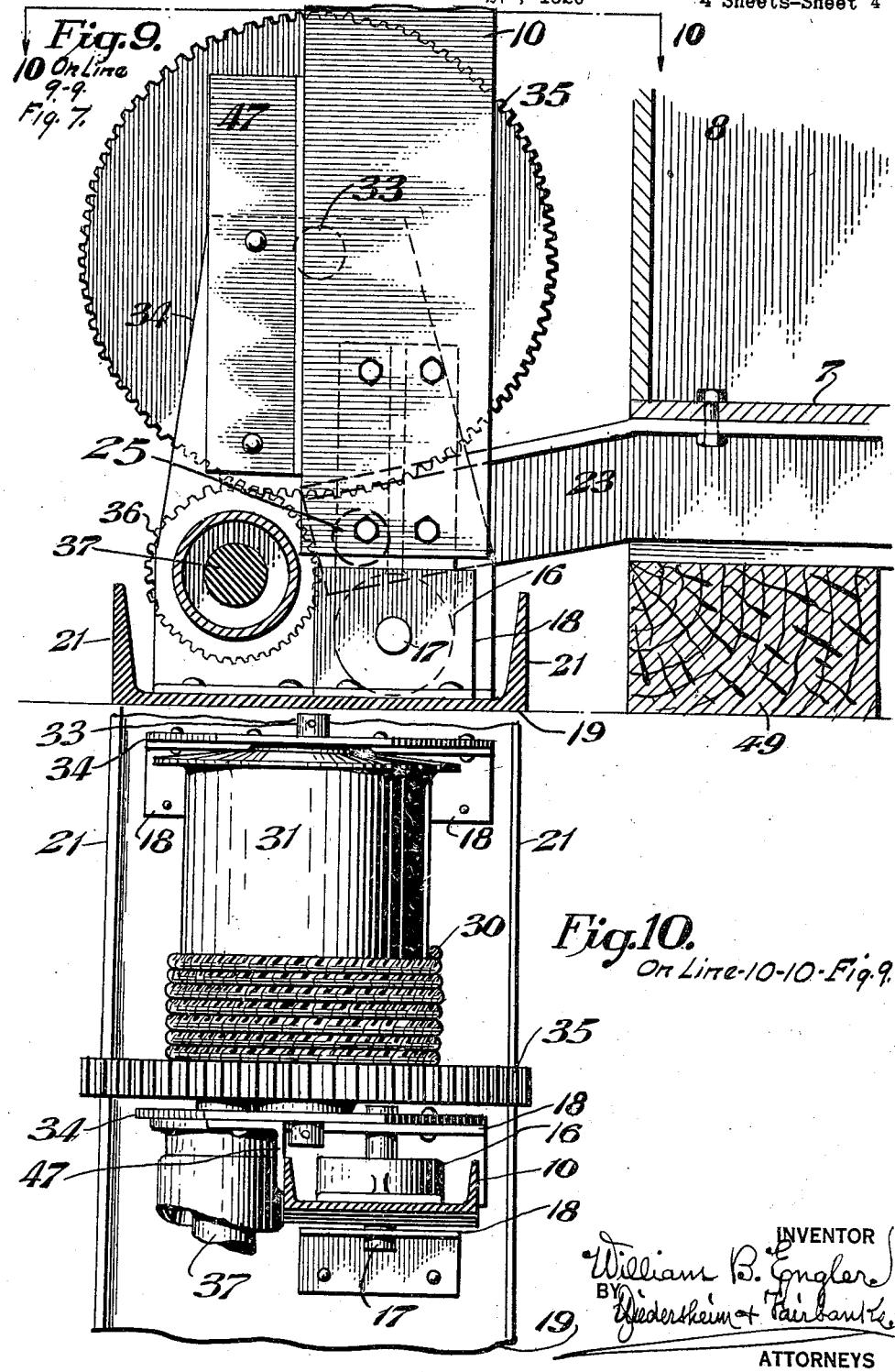

Patented May 1, 1923.

1,453,663

UNITED STATES PATENT OFFICE.

WILLIAM B. ENGLER, OF YOUNGSTOWN, OHIO.

DUMP-BODY HOIST.

Application filed November 27, 1920. Serial No. 426,716.

*To all whom it may concern:*

Be it known that I, WILLIAM B. ENGLER, a citizen of the United States, residing at Youngstown, in the county of Mahoning, State of Ohio, have invented a new and useful Dump-Body Hoist, of which the following is a specification.

My invention consists of a novel form of a dump body hoist in which is provided a freely swinging frame or mast which during the operation of hoisting is automatically held in position by the direction of pull of cables, means being provided for holding the mast or swinging frame in correct position when the body is in its normal position.

For the purpose of illustrating my invention, I have shown in the accompanying drawings, certain forms thereof which are at present preferred by me, since the same will give in practice satisfactory and reliable results, although it is to be understood that the various instrumentalities of which my invention consists may be variously arranged and organized and that my invention is not limited to the precise arrangement and organization of these instrumentalities as herein shown and described.

Figure 1 represents a side elevation of a hoist for a dump body of a motor truck, automobile or other vehicle.

Figure 2 represents a section on line 2—2 Figure 1, showing the manner of hinging the rear portion of the dump body to the truck frame.

Figure 3 represents a side elevation of a portion of the hoisting mechanism showing also the pawl and ratchet mechanism and the braking devices therefor.

Figure 4 represents a section on line 4—4 Figure 1, showing the manner of constructing and assembling the upper portion of the mast or swinging frame.

Figure 5 represents a section on line 5—5 Figure 1, showing the manner of assembling and supporting the mast or swinging frame with respect to the truck frame and showing also the assembling of the hoisting drum, sheaves, cable and their adjuncts.

Figure 6 represents a section on line 6—6 Figure 5 viewed in the direction of the arrows.

Figure 7 represents on an enlarged scale a section on line 7—7 Figure 1, showing particularly the lower portion of the mast or swinging frame and the preferred manner of mounting the lower portion of the hoisting mechanism with respect thereto.

Figure 8 represents a section on line 8—8 Figure 7, showing particularly the manner of securing an end of the hoisting cable to the hinge pin employed.

Figure 9 represents on an enlarged scale a section on line 9—9 Figure 7, showing the relative position of the pivotal connection of the hinged frame or mast and its adjuncts with respect to the dump body and a portion of the mechanism whereby said dump body is raised.

Figure 10 represents a section on line 10—10 Figure 9 showing the hoisting drum, the gearing therefor and the manner of journaling and supporting said hoisting drum.

Similar numerals of reference indicate corresponding parts.

Referring to the drawings:—

It will be evident that in carrying out my invention, the broad principle thereof is applicable to any conventional type of motor truck, automobile or other self-propelled or otherwise propelled vehicle, as 1, having its frame-work preferably formed of the U-shaped or channel shaped beams 2, preferably collocated as seen in Figure 2, and transversely braced or supported in any desired manner, to whose upper flanges are secured the rear bearings 3, through which passes the fulcrum rod 4, whose ends are mounted in the brackets 5, which are secured to the longitudinally extending beams or sills 6, which are secured to the bottom 7 of the dump body 8 in any suitable manner, the fulcrum rod and its adjuncts being located at the rear portion of the truck frame, as will be understood from Figure 1.

At the front of the truck frame, I locate the swinging frame or mast 9, the dump body hoisting mechanism and their adjuncts, which will now be described.

The swinging frame or mast 9 is composed of two channel beams 10, which preferably converge upwardly as seen in Figures 5 and 7, and are braced or tied together at their upper ends by the plates 11, in which the journals 12 and 13 of the upper sheaves 14 and 15 are mounted. The lower ends of the channel beams 10 have secured to them the bosses 16, which are each pivotally mounted or fulcrumed upon the mast pivot points or shafts 17, whose ends are mounted in the plates, brackets or angle irons 18, whose feet or bottom flanges are riveted to the front transverse channel beam 19, whose base seats upon the upper flanges of the beams 2 composing the truck frame, as will be understood from Figures 5, 6, 7 and 8. The front transverse channel beam 19 may be secured in position on the truck frame in any suitable manner, but in order to enable the parts to be readily assembled or disconnected, I preferably employ the securing devices best seen in Figures 5, 6 and 7, wherein the blocks 20 are shown as engaging the flanges 21, and are held in position by the bolts 22, passing through the truck frame, it being apparent from Figures 6 and 8 that the tightening of said bolts will effectively secure the transverse front beam 19 and its adjuncts in position. Said blocks or clamps 20 hold the hoist as a whole to the frame of the truck, that is, by their shape and wedging action on the flange of the channel base, they hold with great tenacity against any tendency to slip along the flange of the channel.

23 designates a pair of forwardly projecting brackets secured to the bottom of the dump body 8 and terminating in the flanges 24, through which passes the rod or hinge pin 25, the latter being located in the lower portion of the U-shaped yoke 26, in the walls of which are mounted the trunnions 27 of the lower sheave 28. To one end of the rod 25 is secured the lower end 29 of the hoisting cable 30, see Figures 5, 7 and 8, said cable passing up over the upper sheave 14, thence downwardly under the lower sheave 28, thence upwardly over the upper sheave 15 and thence to the hoisting drum 31, it being apparent that as said drum is rotated and the cable 30 becomes taut, an upward pull will be exerted on the lower sheave 28, which will raise the latter and its yoke 26, whereupon the bottom 32 of the latter will contact with the rod or hinge pin 25 and will raise it and the flanges 24, brackets 25 and dump body 8 from the position seen in full lines in Figure 1 to the position seen dotted in said figure.

The hoisting drum 31 may be supported and actuated and braced in any suitable manner, but I preferably support the same and its adjuncts upon the channel beam 19, it being apparent from Figures 5, 7, 9 and 10 that the drum shaft 33 has its ends mounted in the plates 34 whose lower ends are suitably supported upon or above the beam 19 in any suitable or convenient manner. The winch or hoisting drum 31 is provided with a gear 35, which is in mesh with and driven by the pinion 36 mounted on the shaft 37 whose outer end 38 is squared for the application of a crank handle 39 thereto, see Figure 7.

Upon the shaft 37 is mounted the ratchet wheel 40, see Figures 3, 5 and 7, whose teeth are engaged by the pawl 41, which is pivoted at the point 42.

43 designates a lever, fulcrumed at the point 44, and having the brake shoe 45 pivoted thereto at 46, it being apparent that the desired manipulation of the lever 43 will release the brake shoe from the periphery of the ratchet wheel 40.

47 designates a stop or stops for retaining the mast or swinging frame in its vertical position (see Figure 5) and the stop 48 also serves to retain said hoist in the proper position with respect to the dump body 8, as will be understood from Figures 1 and 6.

It will be apparent from the foregoing that the various principal elements entering into my invention are composed of standard rolled channels or U-beams or from rolled angle irons, which after being cut to the desired length can be readily assembled, and it will be apparent that the truck frame composed of the longitudinal channels or U-beams 2 and the transverse channel 19 and their adjuncts when assembled in position will be very light, rigid and durable.

It will be further apparent that the mast or swinging frame 9 composed of the channels, beams or bars 10 or the like and assembled and collocated in the manner described, will be light, rigid and durable and will possess the requisite strength and rigidity to withstand the strains and stresses necessary to elevate the front end of the body 8 to such a height that the material contained therein will be discharged by gravity as seen in dotted lines in Figure 1.

It will further be apparent that by my novel construction and collocation of the swinging frame or mast 9, I make provision for the correct alignment of the hoisting sheaves while the body 8 is being hoisted, said swinging frame being automatically controlled in its movements by the relative arrangement and collocation of the various moving parts.

The transverse front beam 49 is preferably secured to the bottom of the front ends of the longitudinal sills 6, as will be understood from Figures 1, 6 and 9, and when the body 8 is loaded or in its horizontal position seen in said figures, said beam 49 rests upon the top of the truck frame members 2.

The operation is as follows:—

The parts normally appear as seen in Figures 1, 5 and 6. Assuming that the dump body 8 has been loaded and it is desired to dump the same, it is only necessary for the operator to apply a crank or handle 29 to the winch pinion shaft 37 as seen at the left of Figure 7. The rotation of the shaft 37 rotates the pinion 36, which is in mesh with the gear 35, which is integral with the drum 31. As the rotation of the winch or hoisting drum 31 tightens the flexible hoist or cable 30, it will be apparent that a pull will be exerted on the latter, so that as the drum 31 is rotated, the lower sheave 28 is drawn towards the upper sheaves 14 and 15, the elevation of the lower sheave 28 simultaneously raises the yoke 26, and as its bottom wall engages the hinge pin 25, it will be apparent that the latter rises and carries with it the flanges 24 of the brackets 23, whereupon the forward end of the body 8 is elevated from the position seen in full lines to the position seen in dotted lines in Figure 1.

The vertically arranged stops 47, which are preferably two pieces of rolled angle irons secured in such a manner as to bear against the forward side of the swinging frame 9, prevent the latter from swinging forward past the vertical position or thereabouts, and the hinge pin 25 seen in Figures 5, 6, 7 and 9 is preferably so collocated with respect to the pivotal support of the mast or swinging frame 9, that it is slightly forward of the mast pivot points or pins 17, so that when the force required to lift the body 8 is applied, the direction of pull on the sheaves 14 and 15 at the top of the swinging frame 9 will tend to move the latter forward rather than backward towards said body 8. Any forward movement of said swinging frame is, however, prevented by the stops 47 and the swinging frame will remain stationary until the pin 25 following through the path indicated by the dotted line a, see Figure 6, reaches a point about where its path crosses the center line of the swinging frame. From this point on to the limit of travel of the pin 25, the swinging frame 9 will move rearwardly, its movement being governed by the rearward movement of said pin 25, but said swinging frame will always be in stable equilibrium during its entire rearward movement.

It will be apparent that by the employment of the swinging frame 9, I provide for the accurate alignment of the hoisting sheaves while the body is being hoisted, and that said swinging frame is automatically controlled in its movements by the relative arrangement and collocation of the various moving parts. Attention is directed to the fact that the swinging-frame is held in correct position relative to the body by the direction of the pull of the cables during the operation of hoisting only, and that when the body is resting on the frame of the truck, the cables are slack, and said swinging frame is held in position by the stops 47 and 48.

After the body 8 has reached substantially the position seen in dotted lines in Figure 1, it will be apparent that by the proper manipulation of the lever 43, the pressure of the brake member 45 upon the periphery of the ratchet wheel 40 can be regulated so as to allow the body 8 to descend and assume the position seen in full lines in Figure 1 without any shock to the various parts.

The stop 48 seen in Figures 1 and 6 is interposed between the swinging frame 9 and the body 8 to prevent movement of the swinging frame when the hoist is not in use, and since said body during its elevation has a simultaneous rearward and upward movement, it will be apparent that said stop does not interfere in any way with the movement of the swinging frame or mast 9.

I desire to call especial attention to the feature of locating the hinge pin 25, either in or forward of a vertical plane passing through the mast pivot points 17, as will be understood from Figure 9, since this construction provides for the proper functioning of the coacting elements, as will be apparent to those skilled in the art.

It will now be apparent that I have devised a novel and useful hoist for a dump body of an auto or other vehicle which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention what I claim as new and desire to secure by Letters Patent, is:—

1. In a dump body hoist, a vehicle frame, a dump body pivotally mounted on said vehicle frame, a mast freely swinging rearwardly and pivotally mounted on the base of said hoist, fixed stops so located as to prevent said mast from swinging forward, arms attached to the forward end of said body, a pivotal pin carried by said arms and located forwardly of a vertical plane through the pivots of said mast, a flexible cable, a series of sheaves and a winding drum connecting said pin with said mast, by the manipulation of which, the front end of said body may be hoisted and whereby when said pin in its upward and rearward travel has crossed approximately the center line of said mast, the direction of pull of said cable maintains said mast in a state of stable equilibrium and causes its rearward movement to conform to that of said body.

2. In a dump body hoist, a vehicle frame, a mast freely swinging rearwardly and pivotally mounted on the base of said hoist, arms attached to the forward ends of said body, a pivotal pin carried by said arms and located approximately forwardly of a vertical plane through the pivots of said mast, a flexible cable, a series of sheaves and a winding drum connecting said pin with said mast, by manipulation of which the front end of said body may be hoisted and whereby when said pin in its upward and rearward travel has crossed approximately the center line of said mast, the direction of pull of said cable maintains said mast in a state of stable equilibrium and causes its rearward movement to conform to that of said body.

3. In a device of the character stated, a truck frame, a dump body pivoted at its rear end thereon, a freely swinging mast on the truck frame, hoisting cables normally slack when the said body is resting on the frame, provisions whereby the said swinging mast is held in correct position relative to said body during the operation of hoisting only, fixed stops for contact by said mast to prevent forward movement of the latter, and a stop on said mast for engagement with the body to retain the hoist in proper position with respect to the dump body.

WILLIAM B. ENGLER.

Witnesses:
MARIE SEAFERT,
JOSEPHINE R. HARPER.